United States Patent [19]
Walles

[11] 4,260,225
[45] Apr. 7, 1981

[54] ENERGY SAVING RADIANT INSULATIVE DEVICE

[75] Inventor: Wilhelm E. Walles, Freeland, Mich.

[73] Assignee: The Dow Chemical Company, Midland, Mich.

[21] Appl. No.: 49,777

[22] Filed: Jun. 18, 1979

Related U.S. Application Data

[63] Continuation-in-part of Ser. No. 34,080, Apr. 27, 1979, abandoned, which is a continuation of Ser. No. 846,745, Oct. 31, 1977, abandoned.

[51] Int. Cl.³ .............................................. B32B 1/06
[52] U.S. Cl. ................................... 350/353; 350/312
[58] Field of Search ...................... 350/353, 312, 172; 260/77.5

[56] References Cited

U.S. PATENT DOCUMENTS

| | | | |
|---|---|---|---|
| 2,946,772 | 7/1960 | Walles et al. | 260/77.5 |
| 2,946,773 | 7/1960 | Walles et al. | 260/77.5 |
| 2,948,708 | 8/1960 | Walles et al. | 260/77.5 |
| 3,054,764 | 9/1962 | Walles et al. | 260/29.6 |
| 3,290,203 | 12/1966 | Antonson et al. | 428/350 |
| 3,429,773 | 2/1969 | Wolf et al. | 350/172 |
| 3,470,049 | 9/1969 | Reusch | 350/253 |
| 3,499,697 | 3/1970 | Edwards | 350/1.6 |
| 4,082,892 | 4/1978 | Frump | 428/332 |

*Primary Examiner*—William L. Sikes

[57] ABSTRACT

A device containing a normally transparent polymeric fluid which becomes sufficiently less transparent at a preselected temperature to reduce the transmission of light and radiant heat therethrough is provided. The conversion of the polymeric fluid from a transparent to a less transparent state is reversible and is a physical transformation which can be repeated an infinite number of times. For example, an enclosure member of a transparent film of a polymer such as polystyrene or polycarbonate which encloses a solution of a polymer with inverse solubility in the solvent, such as polyvinyl oxazolidinone in water, is usefully employed in office buildings and homes for the control of temperature within a desired range, thereby reducing the amounts of energy consumption.

18 Claims, 3 Drawing Figures

ENERGY SAVING RADIANT INSULATIVE DEVICE

CROSS-REFERENCE TO RELATED APPLICATION

This application is a continuation-in-part of Ser. No. 034,080 filed Apr. 27, 1979, now abandoned, which is a continuation of Ser. No. 846,745, filed Oct. 31, 1977, now abandoned.

BACKGROUND OF THE INVENTION

This invention relates to devices exhibiting a variable transmittance of light and radiant heat. More particularly, it relates to those structures which transmit light and radiant heat at one temperature, but which become less permeable to the transmission of light and radiant heat when exposed to a second, preselected temperature.

In bright sunlight, closed edifices made primarily from glass and buildings with glass windows experience heat buildup due to transfer of heat from the sun through the glass via radiation. Heretofore, glass has been coated by some means to prevent this heat transfer. For example, greenhouses, especially the roof areas, are generally sprayed with a white pigment thereby reducing light transmission and radiant heat buildup. Application of the white pigment is difficult, must be repeated at regular intervals and leaves an aesthetically undesirable appearance. More importantly, although light and radiant heat transmission may be desired at various times, pigmentation permanently reduces the transmission of heat and light.

More recently, glass has been tinted with dyes, etc., or has been coated with a reflective-transparent solar control film. For example, U.S. Pat. No. 3,290,203 describes a solar control film consisting of a composite of a thin layer of metal, such as aluminum, deposited on a thin transparent plastic film. The composite is attached to a glass window by a water-activated adhesive, to reduce ultraviolet, infrared and visible light transmission and heat radiation. While such solar control films eliminate the aesthetically undesirable effects of pigmentation, they are generally more expensive. Furthermore, the usefulness of such solar control films is reduced by the pressure of unattractive gas bubbles in the water-soluble and pressure-sensitive adhesives normally used to adhesively bond the composite to the glass. Heat-sensitive adhesives have been found that eliminate this problem, however, the adhesives have a short shelf life making their utilization impractical. Moreover, like pigmentation, the application of transparent reflective films to glass renders the window permanently reflective, thereby reducing light and radiant heat transmission even when transmission of substantial amounts of heat and light are desired. Tinted glass eliminates the application problem experienced with the solar control film. As with pigmented glass, however, the partial transparency of the tinted or dyed glass is the same regardless of the weather conditions.

Plastic films such as high and low density polyethylene, polyester, ethylene/vinyl acetate copolymer, polyvinyl chloride, polybutylene, polyvinyl fluoride and polycarbonate are being employed as envelopes for inflatable structures and are replacing glass as greenhouse covers. The plastic films are often made permanently translucent to prevent excessive light transmission and radiation heat buildup. As with the aforementioned methods, such plastic films exhibit partial transparency which does not change with variations in the environmental conditions such as temperature and light.

In view of the aforementioned deficiencies of the prior art devices, it would be highly desirable to provide an energy saving device which has the ability to reduce light transmission and heat radiation when the conditions warrant, i.e., periods when the sun is bright and the temperature high, but which permits full light and heat transmission at other times when temperatures are lower.

SUMMARY OF THE INVENTION

Accordingly, the present invention is such an energy saving device comprising a light transmissive enclosure member containing a polymeric fluid which is transmissive to light and radiant heat at one temperature and sufficiently less transparent at some different temperature to reduce the transmission of light and/or radiant heat therethrough. This reduced transparency is caused by the polymeric fluid separating into at least two distinct phases, e.g., a polymer-rich phase and a solvent-rich phase, as the fluid is adjusted from an initial temperature to some other temperature different from the initial temperature. The device readily reverts to its more light transmissive state when the temperature of the fluid is adjusted to a temperature at which the phases recombine to form a single phase.

Surprisingly, when the energy saving insulative device of this invention is heated by sunlight or some other radiant heat source to a preselected temperature at which phase separation occurs, the phase separation turns the device sufficiently less transparent to significantly reduce the transmission of light and radiant heat through the device. When the device cools to a temperature below the preselected temperature, the two phases recombine to form a single phase, and the device again becomes permeable to the passage of light and radiant heat. Thus, the device serves to maintain a more constant level of naturally supplied light and temperature in a building or like structure, thereby reducing energy consumption.

The insulative device of this invention is particularly useful in any application where radiation heat loss or buildup or undesirable light transmission through glass, transparent plastic or the like exists. For example, these devices can be employed in greenhouses, office buildings, factories, schools, homes, workshops, laboratories and other buildings in which on sunny days some light is desirable, but diffused light is better than direct sunlight and on cold or cloudy days, transmission of essentially all naturally supplied light is desirable.

BRIEF DESCRIPTION OF THE DRAWINGS

Understanding of the invention will be facilitated by referring to the accompanying drawings, in which.

DETAILED DESCRIPTION OF PREFERRED EMBODIMENTS

Figure 1:
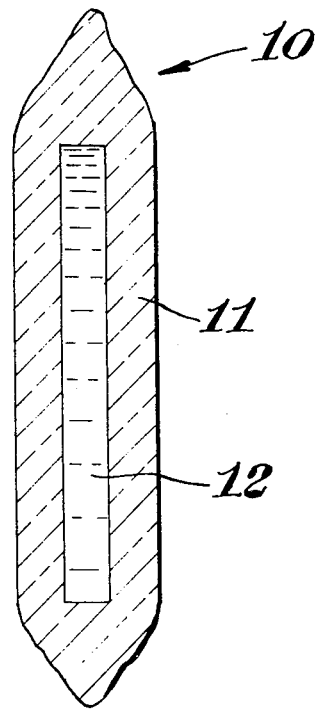
FIG. 1 is a cross-sectional schematic representation of an embodiment of this invention.

Referring now more particularly to the drawings, FIG. 1, which represents one embodiment of this invention, depicts a device 10 comprising a transparent enclosure member 11 containing a normally light and heat transmissive polymeric fluid 12. Both the enclosure member and polymeric fluid are illustrated in greater detail hereinafter.

Figure 2:
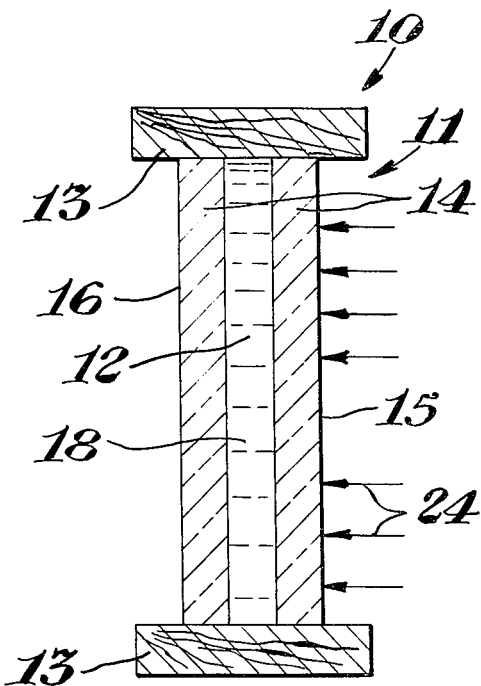
FIG. 2 is a cross-sectional schematic representation of a framed laminate windowpane device.

Alternatively as shown in FIG. 2, an enclosure member 11 of device 10 has two transparent panels 14 which are spaced apart and held in place by a frame 13. A polymeric fluid 12 is disposed in the enclosed space 18 between the transparent panels 14 and contained by the enclosure member 11. In operation, light generated by the sun or some other light source 24, passes through one of the transparent panels. As the light passes through the polymeric fluid, sufficient heat is generated in the fluid to elevate its temperature to within the range wherein the fluid separates into at least two distinct phases. The fluid 12 is thus rendered less transparent, thereby reducing the transmission of light through the device from side 15 to other side 16. When the intensity of light from the light source 24 is reduced, the heat being generated in the polymeric fluid 12 and, correspondingly, the temperature of the fluid 12 are also reduced. When the reduction of temperature of the fluid is sufficient, the separated phases thereof recombine, thereby returning the polymeric fluid to its original light transmissive condition.

Figure 3:
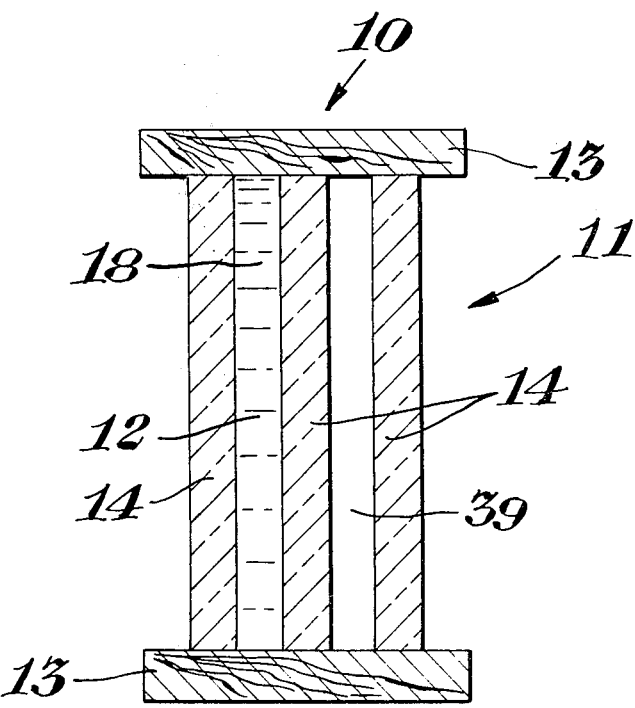
FIG. 3 is a cross-sectional schematic representation of a framed laminate windowpane device having a thermal insulation layer.

In FIG. 3 depicting another embodiment of the invention, a device 10 has an enclosure member 11 having three transparent panels 14 which are each spaced apart from the others by a frame 13 to define two enclosed spaces 18 and 39. A polymeric fluid 12 resides in space 18 and the space 39 is a dead air space for thermal insulation.

For the purposes of this invention, a light transmissive enclosure member is intended to mean any transparent, translucent or similar material capable of transmitting light and capable of containing the polymeric fluid as defined in detail hereinafter. Preferably, such materials are transparent materials such as glass, plastic film or other transparent sheet materials. Examples of transparent or nearly transparent plastic films include polyester, low and high density polyethylene, polybutylene, polyvinyl chloride, polyvinyl fluoride, polycarbonate, polypropylene, nylon, cellulose-type films, polyvinylidene dichloride, ethylene/vinyl acetate copolymer and the like. Such films can be prepared by any of the well known methods. It is preferred for the purposes of this invention that the plastic be relatively inert to and insoluble in the polymeric fluid. When the particular application requires, the plastic advantageously contains UV stabilizers, antioxidant systems and the required strength for prolonged outdoor exposures.

The polymeric fluid of this invention comprises a solvent and a polymer which polymer is soluble in the solvent at one temperature but which separates into a distinct polymer-rich phase insoluble in the solvent-rich phase, i.e., forms at least two distinct phases, at a different temperature thereby causing the polymeric fluid to cloud. This clouding reduces the amount of light and/or radiant heat transmitted through the polymeric fluid. As employed herein, the term "clear mode" will apply to the polymeric fluid wherein the polymer and solvent form a solution and the term "cloudy mode" shall apply to the polymeric fluid when the polymer is separated in a distinct phase from the solvent. The transformation of the polymeric fluid from a clear to cloudy mode will hereinafter be referred to as "clouding." By the term "reduce the light transmission" it is meant that the amount of light transmitted through the polymeric fluid in the cloudy mode (or a device containing same) is reduced by an amount measurable using conventional techniques, e.g., as measured by a UV spectrophotometer such as a Beckman UV spectrophotometer Model DB-G, when compared with the same polymeric fluid in the clear mode (or a device containing same). Similarly, the radiant heat transmission is reduced when the radiant heat transmission exhibited by polymeric fluid in the cloudy mode (or a device containing same) is less than the same polymeric fluid in the clear mode (or a device containing same) by an amount measurable using a conventional test method, e.g., the methods employed in Example 2.

In the clear mode, the polymeric fluid advantageously transmits at least about 70, preferably at least about 80, more preferably at least about 90, percent of the light falling thereon. Alternatively, the amount of light or radiant heat most advantageously transmitted by the polymeric fluid in the cloudy mode will vary depending on the end use application. For example, in some applications a polymeric fluid exhibiting only a slight reduction in light transmission is desired, whereas, in other applications, a polymeric fluid which is translucent or opaque in the cloudy mode is desired.

Of such polymers, the polymers advantageously employed herein are those polymers which at normal or lower temperatures (from about 18° to about 25° C.) are soluble in the solvent at concentrations of at least 10 weight percent, preferably at least 20 weight percent. Preferably, the solubility characteristics of the polymer are such that at least 95 weight percent, preferably 99 weight percent, of the polymer initially dissolved in the solvent is soluble in the solvent at temperatures within 5° C., preferably 2° C., more preferably within 1° C. of the preselected higher temperature at which phase separation is desired. Moreover, upon separation into a polymer-rich phase and a solvent-rich phase, preferably at least 50 weight percent, more preferably at least 90 weight percent, of the polymer initially dissolved in the solvent is no longer soluble in the solvent-rich phase. The exact temperature at which separation begins will be dependent upon the specific polymer and the particular solvent. Generally, for the most insulative applications, separation is desirable at temperatures between about 25° and about 90° C., more desirably between about 30° and 60° C.

Suitable polymers having inverse solubility are the polymers, both homopolymers and copolymers, of the following monomers: the N-substituted ethylenically unsaturated lactams represented by the structure:

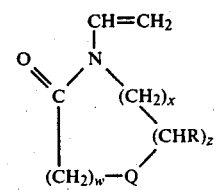

wherein Q is O; C=O, NH or $CH_2$; R is an alkyl group such as methyl or ethyl or substituted alkyl group such as chloromethyl; w is either 0 or 1; z is either 0 or 1 and x is 1, 2, 3 or 4; such as N-vinyl morpholinone; lactam ethers such as oxazoline; hydroxyalkyl esters of α,β-ethylenically unsaturated carboxylic acids wherein the alkyl has 2 to 5 carbon atoms, such as hydroxypropyl acrylate and hydroxypropyl methacrylate and β-hydroxyalkyl acrylamides wherein the alkyl has 2 to 5 carbon atoms such as N-propyl acrylamide. Generally, copolymers of the above-mentioned monomers can comprise any proportion of any one or more of the aforementioned monomers. Preferred polymers are homopolymers of a N-vinyl oxazolidinone and copolymers of between about 1 and about 99 weight percent of a N-vinyl oxazolidinone with from about 99 to 1 weight percent of another N-substituted ethylenically unsaturated lactam monomer, preferably those represented by the structure:

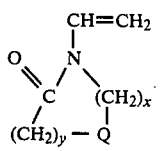

wherein Q represents C=O, O or CH$_2$; y is 0, 1, or 2 and x is 0, 1, 2, 3 or 4. Examples of such other lactam monomers include N-vinyl pyrrolidinones, N-vinyl morpholinones, N-vinyl piperidinones, N-vinyl caprolactams and N-vinyl succinimides.

Especially preferred N-vinyl oxazolidinone monomers as described in U.S. Pat. Nos. 2,946,772 and 2,948,708 are N-vinyl-5-ethyl-2-oxazolidinone and N-vinyl-5-methyl-2-oxazolidinone. Especially preferred other N-substituted ethylenically unsaturated lactam monomers as described in U.S. Pat. Nos. 2,946,772 and 2,948,708 are N-vinyl-2-pyrrolidinone, N-vinyl-2-piperidinone, N-vinyl-2-caprolactam, N-vinyl succinimide and N-vinyl-3-morpholinone.

The preferred polymers can be prepared according to the methods as outlined in U.S. Pat. No. 2,946,772. Briefly summarized, this patent teaches the polymeric products can be prepared by any conventional manner such as polymerization in mass (often-times referred to as bulk polymerization) and polymerization, at practically any level of concentration, in aqueous or other solution or in emulsion or other dispersion in liquids with which the particular monomers being copolymerized are not soluble or are only partially soluble. It is ordinarily beneficial for the polymerization to be conducted at a temperature between about 50° C. and 100° C., although this may vary with the particular initiators used and the type of reaction being conducted. Suitable initiators for the copolymerization include the azo initiators such as α,α'-azobisisobutyronitrile, peroxygen initiators, such as potassium persulfate, benzoyl peroxide, lauroyl peroxide, hydrogen peroxide and the like, and irradiation under the influence of high energy fields. The copolymers may advantageously be prepared as high polymers having weight average molecular weights, for example, in the range from 5,000 or 10,000 to several hundred thousand.

Advantageously, the solvents employed in the polymeric field of the present invention are those liquids in which the polymer is completely soluble at one temperature but is essentially insoluble, i.e., will cause the polymeric fluid to separate into distinct phases, at some other temperature. By "completely soluble" it is meant that the polymer either dissolves or is dispersed in the solvent at the desired concentrations to provide a single phase fluid. Advantageously, liquids which are often used as such solvents are those which exhibit low volatility, e.g., vapor pressure less than 300 mm Hg at an environmental pressure of 760 mm Hg and temperatures of up to about 75° C., and do not freeze at temperatures of down to about 0° C., preferably down to −20° C. Examples of such liquids include water; glycols such as ethylene glycol, propylene glycol, diethylene glycol and dipropylene glycol; and glycol ethers such as butylene glycol methyl ether, diethylene glycol n-butyl ether, dibutylene glycol methyl ether and dipropylene glycol methyl ether or any combination of these liquids.

In the practice of this invention, the particular polymer-solvent combination (polymeric fluid) employed is dependent upon the temperature at which clouding is desired. For example, as described in U.S. Pat. Nos. 2,946,772; 2,946,773 and 2,948,708, the initial clouding temperature of a preferred aqueous polymer solution ranges from about 3° C. to 100° C. depending upon polymer composition. Using solvents other than water increases this initial clouding temperature range from about −20° to about 120° C. By "initial clouding temperature" it is meant that initial temperature at which the polymer will separate into a polymer-rich phase and a solvent-rich phase. Advantageously, the initial clouding temperature of the inversely soluble polymers of this invention can generally be controlled within 1° C. Preferably, the change is rapidly reversible, providing a clear solution almost immediately upon cooling below the initial clouding temperature.

In general, water is the preferred solvent for the inversely soluble polymer produced in accordance with this invention. However, in many applications, the solvent advantageously comprises a combination of water with other solvents or compounds to provide the desired polymeric fluid. For example, where the energy saving device of this invention is employed at conditions such that there exists a possibiliity of water freezing, it is often desirable to use a polymeric fluid having a lower freezing point. Advantageously, such polymeric fluid is a mixture of water and a water-miscible organic liquid which, then added to water, lowers the freezing point thereof. Representative of such organic liquids advantageously employed herein are glycerol, sorbitol, lower alkyl alcohols such as ethanol and propanol, and water-soluble glycols or glycol ethers. The type and amount of such water-miscible organic liquids most advantageously employed herein are based on the temperature range to which the device will be exposed and are selected accordingly. Alternatively, a freezing point depressing agent such as a water-soluble, readily ionizable salt which is compatible with the polymeric fluid can be employed. The amount of such freezing point depressing agent most advantageously employed is dependent primarily on the minimum temperatures to which the device will be exposed. Generally, the concentration of the freezing point depressing agent should be as low as practical to minimize other effects it may have on the polymeric fluid.

In addition, the ability of the polymeric fluid in the cloudy mode to reduce light and/or radiant heat transmission is dependent upon the droplet size of the material comprising the polymer-rich phase. In general, as droplet size increases, the amount of light and radiant heat transmitted by the polymeric fluid also increases. The viscosity of the polymeric fluid has been found to be a primary factor in the formation and coalescense of these droplets. Typically, the higher viscosities give smaller droplet sizes. Thus, as the viscosity of the solvent increases, due to the smaller droplet size of the polymer-rich phase, the amount of light and radiant heat transmitted by the polymeric fluid in the cloudy mode decreases. Therefore, although unnecessary in the majority of end use applications, the ability of the polymeric fluid to reduce light and heat transmission is enhanced by increasing the viscosity of the polymeric fluid.

In general, the polymeric fluid can be prepared with the desired viscosity by selecting the proper solvent or combination of solvents. For example, the viscosity of a polymeric fluid prepared using water as a solvent can be increased by using a combination of water with a water-miscible organic liquid having a viscosity greater than water. Such water-miscible organic liquids advantageously employed herein include the water-soluble glycols such as diethylene glycol, ethylene glycol, propylene glycol and dipropylene glycol; glycerol; sorbitol; water-soluble glycol ethers and water-soluble glycol esters. These organic liquids are particularly beneficial since they also serve as a freezing point depressing agent for the water permitting a wider temperature range of utility. Alternatively, the viscosity of a particular solvent can be increased by adding an incrassating agent thereby. By "incrassating agent" it is meant a compound which is not normally useful as the solvent in the polymeric fluid and which, when added to the polymeric fluid, increases the viscosity thereof. Incrassating agents advantageously employed herein are those agents which do not impair the liquid polymer's ability to cloud or decrease the transparency of the polymeric fluid at temperatures at which the polymer is soluble. In volatile organic solvents, preferred incrassating agents include fumed silica, starch, polyacrylamide and swellable organic polymers, with fumed silica being most preferred. When water is used as the solvent, the preferred incrassating agent is fumed silica. Such incrassating agents are employed at the lowest effective concentration to reduce other effects on the system. The viscosity most advantageously employed in the practice of this invention is generally dependent on the end use application. Typically, to minimize light and radiant heat transmission, the viscosity of the polymeric fluid is such that the coalescence of the droplets of the polymer-rich phase is minimized. Viscosities of greater than about 5,000 centipoises as measured by a Brookfield viscometer at 25° C. are advantageously employed.

In addition, when the solvent comprises water, it is often desirable to employ a humectant to prevent water loss via vaporization through the transparent enclosure member. A humectant is particularly beneficial when a thin plastic film is used as the enclosure member. Advantageously, the humectant does not affect the ability of the polymeric fluid to cloud or decrease the transparency of the fluid at temperatures at which the polymer is soluble. Typically, a mixture of water and a water-miscible organic liquid which serves as a humectant for water, which liquids include glycerol, sorbitol, water-soluble glycols and the like, is employed. In general, such liquids are also employed to lower the freezing point and/or increase the viscosity of the polymeric fluid. Thus, while the solvent of the polymeric fluid will generally comprise between about 5 and about 95 weight percent of the humectant based on the weight of the polymer, the concentration of the organic liquid most advantageously employed within said range will vary depending on the thickness of the plastic film, the water vapor transmission rate of the plastic and the specific humectant employed as well as the temperature range to which the polymeric fluid is employed and the desired viscosity of said polymeric fluid. Generally, when glass is used as the enclosure member, the solvent does not require a material (humectant) to prevent water evaporation losses.

In the practice of this invention, the polymers are normally dissolved in the solvent at some temperature at which the polymer is completely soluble and at concentrations which will cause clouding of the entire polymeric fluid upon the separation of the polymer at some higher temperature and which, upon clouding, provides the desired reduction in light and/or radiant heat transmission. In general, as the amount of the polymer in the polymeric fluid increases, the transparency of the polymeric fluid in the cloudy mode decreases. In most end use applications, the concentration of the solvent is between about 5 and about 95, advantageously between about 10 and about 90, weight percent and the concentration of the polymer is between about 95 and about 5, advantageously between about 90 and about 10, weight percent, said weight percentages being based on the total weight of the polymeric fluid. The preferred polymeric composition comprises from about 80 to about 50 weight percent of the solvent and from about 20 to about 50 weight percent of the polymer.

After combination of the polymer, solvent and optional adjuncts, the resulting polymeric fluid is placed in the enclosed space that is at least partially circumscribed by a transparent enclosure member. Any open ends of the enclosure member are sealed by some means such as by framing the member, fusing the sides of the enclosure member or the like. The transparent enclosure member is generally plastic film having a thickness of between about 0.02 and about 2 mm or glass sheeting having a thickness of from about 0.5 to about 6.5 mm. The preferred thickness of the polymeric fluid in the enclosure member is dependent upon many factors including the properties of the polymeric fluid, such as its viscosity, the solvent and specific polymer used, the desired level of light to be transmitted and the temperature differentials to be maintained. Generally, thicknesses of from about 0.02 mm to about 2 mm will perform sufficiently in all but the most extreme temperature conditions. The device is produced such that the polymeric fluid completely fills the enclosed space between the walls or sides of the transparent enclosure member.

A preferred embodiment of this invention is a double paned window containing the polymeric fluid between glass panels as depicted in FIG. 2. The glass panels are conventionally supported by a wooden or metal frame with a space between two panes of glass. In the practice of this invention, the polymeric fluid would be added between glass layers to fill this space.

A further preferred embodiment of this invention is a normally transparent device containing both a polymer of inverse solubility made in accordance with this invention and a polymer of regular solubility, the solubility characteristics of the latter polymer being such that the polymer remains soluble at higher temperatures, but separates at lower temperatures to form an insoluble layer. The two polymers can be contained in two distinct fluids which are separated by a suitable membrane such as glass or plastic film. Alternatively, they may be mixed to form a single fluid. In either case, the device will cloud at two different temperatures providing a cloudy appearance at lower temperatures, such as below 0° C. and higher temperatures, such as above 25° C., and a clear appearance at all temperatures in between this range. Thus, light transmission and radiant heat buildup are effectively reduced during periods of sunshine and warm weather, while radiation heat loss is effectively reduced during periods of colder weather.

The following examples are set forth to illustrate the invention and should not be construed to limit its scope. In the examples, all parts and percentages are by weight unless otherwise specified.

EXAMPLE 1

A polymeric fluid is prepared by mixing a homopolymer of N-vinyl-5-methyl-2-oxazolidinone (hereinafter referred to as PVO-M) having a weight average molecular weight of 150,000, water and glycerol in the following proportions:
42 parts PVO-M;
42 parts water;
16 parts glycerol.
This polymeric fluid is introduced into the enclosed space of a glass enclosure member of the type depicted in FIG. 1, wherein 3 mm glass panes are spaced about 3 mm apart. As a control, the enclosure space of an identical glass enclosure member is filled with glycerol instead of the polymeric fluid. Both enclosure members are subjected to sunlight sufficient to elevate the temperature of the enclosed polymeric fluid to at least 35° C. At this temperature, the polymer separates in an insoluble polymer-rich phase, giving a cloudy appearance. The percent light transmission is measured over the spectral range of 0.3 to 2.5 mm using a spectrophotometer for the glass enclosure member containing glycerol and the glass enclosure member containing the polymeric fluid. It is found that the glass enclosure member containing the polymeric fluid transmits only 2 percent of the light transmitted through the glass enclosure member containing glycerol. When the temperature of the enclosure member is reduced to 25° C., at which point the polymeric fluid becomes transparent, the glass enclosure member containing the polymeric fluid transmits the same amount of light as the enclosure member containing the glycerol.

EXAMPLE 2

The polymeric fluid of Example 1 is introduced into the enclosed space of a glass enclosure member of the type depicted in FIG. 1, wherein 3 mm glass panes are spaced 3 mm apart. As a control, the enclosure space of an identical glass enclosure member is filled with glycerol instead of the polymeric fluid. Two 3.8 cm polystyrene foam sheets with a window of about 6×6 cm are prepared. Into the window area of one polystyrene sheet is placed the glass enclosure member containing the polymeric fluid. The control enclosure member is placed into the other polystyrene foam sheet.

A greenhouse type structure having a 15×32 cm framed base and 24 cm high walls is constructed using 0.05 mm low density polyethylene. The vertical walls of the greenhouse are covered with 3 mm thick cardboard. The roof of the greenhouse is 0.05 mm thick low density polyethylene having a slope of 45°. A thermocouple connected to a recording device is inserted into the center of the greenhouse to measure temperatures therein. The original temperature inside the greenhouse is 25° C.

One roof portion is covered with the polystyrene foam sheet having the glass enclosure member containing the polymeric fluid. This roof area is then subjected to the light and heat of a 250 watt heat lamp placed 25 cm from the greenhouse. The heat lamp has a spectrum somewhat similar to sunlight. The light and heat from the heat lamp is applied continuously for 50 minutes. Temperatures are recorded over this period at 2 minute intervals for the first 10 minutes and at 5 minute intervals thereafter. After approximately 2 minutes, clouding of the polymeric fluid takes place. At this time, the temperature in the greenhouse is 29° C.

This procedure is repeated with a control sample of the polystyrene foam sheet having the glass enclosure member containing glycerol. Presented in Table I are the results of the temperature recordings for both the control (Sample No. C) and the enclosure member containing the polymeric fluid (Sample No. 1), expressed as the temperature rise above the original temperature in the greenhouse.

TABLE I

| | Temperature Rise in Greenhouse, °C. Time, min. | | | | | | | | | | | | |
|---|---|---|---|---|---|---|---|---|---|---|---|---|---|
| Sample No. | 2 | 4 | 6 | 8 | 10 | 15 | 20 | 25 | 30 | 35 | 40 | 45 | 50 |
| 1 | 4.0 | 4.3 | 4.5 | 4.7 | 5.1 | 6.2 | 7.6 | 8.6 | 9.0 | 9.3 | 9.4 | 9.5 | 9.5 |
| C* | 4.0 | 6.2 | 7.6 | 8.3 | 9.0 | 10.2 | 11.2 | 11.8 | 12.1 | 12.3 | 12.5 | 12.7 | 12.8 |

*Not an example of this invention.

The glass enclosure member containing the polymeric fluid shows a reduction in the rate of temperature rise within the greenhouse when compared to the control.

EXAMPLE 3

Enclosure members are prepared in the same manner as in Example 1 with the exception that a 0.05 mm film of ethylene/vinyl acetate (90/10) copolymer is used instead of 3 mm glass to enclose the polymeric fluid and the glycerol control. These enclosure members are subjected to sunlight and percent light transmission is measured in the same manner as Example 1. Clouding of the polymeric fluid occurs at the same temperature as in Example 1. After clouding takes place, the enclosure member transmits only 2 percent of the light which the enclosure member containing only glycerol transmits. When the temperature is lowered to a temperature at which the two phases recombine to form a single phase, the enclosure member containing the polymeric fluid transmits essentially the same amount of light as the enclosure member containing the glycerol only.

What is claimed is:

1. An energy saving device comprising a light transmissive enclosure member containing a polymeric fluid, said polymeric fluid being transmissive to light and radiant heat at a first temperature and being sufficiently less transparent at a second temperature different from the first temperature, due to separation of the polymeric fluid into at least a polymer-rich phase and a solvent-rich phase at said second temperature, to reduce light and radiant heat transmission therethrough, the device being capable of reverting to its original light transmissive state when the temperature of said polymeric fluid is adjusted to the first temperature.

2. The device of claim 1 wherein the light transmissive enclosure member is plastic.

3. The device of claim 1 wherein the light transmissive enclosure member is glass.

4. The device of claim 1 wherein the polymeric fluid comprises water and a polymer having inverse solubility in water.

5. The device of claim 4 wherein the polymeric fluid also contains a compound selected from the group consisting of glycerol, water-soluble glycols, water-soluble glycol ethers and glycol esters, sorbitol and lower alkyl alcohols.

6. The device of claim 1 wherein the polymeric fluid comprises a solvent and a polymer, the polymer being soluble in the solvent at a concentration of at least 10 weight percent at temperatures at which the polymeric fluid is one phase and having inverse solubility in the solvent, such that the polymeric fluid separates into distinct phases at some higher temperature.

7. The device of claim 6 wherein the higher temperature is in the range from about 25° and about 90° C.

8. The device of claim 6 wherein the higher temperature is in the range from about 30° and about 60° C.

9. The device of claim 6 wherein at least 50 percent of the polymer separates to form a polymer-rich phase uniformly dispersed throughout a solvent-rich phase.

10. The device of claim 6 wherein at least 90 percent of the polymer separates to form a polymer-rich phase uniformly dispersed throughout a solvent-rich phase.

11. The device of claim 1 wherein said polymer is a polymer polymerized from one or more monomers selected from the group consisting of N-substituted ethylenically unsaturated lactams represented by the structure:

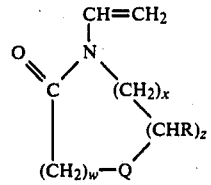

wherein Q represents O, C=O, NH or CH₂; w is 0 or 1; x is 1, 2, 3 or 4; z is 0 or 1 and R is an alkyl or substituted alkyl, lactam ethers, hydroxyalkyl esters of acrylic or methacrylic acid wherein alkyl has 3 to 5 carbon atoms and β-hydroxyalkyl acrylamides wherein alkyl has 3 or 5 carbon atoms.

12. The device of claim 1 wherein said polymer is N-vinyl oxazolidinone, N-vinyl pyrrolidinone, N-vinyl morpholinone, N-vinyl oxazoline, hydroxypropyl acrylate, hydroxypropyl methacrylate or hydroxypropyl acrylamide.

13. The device of claim 12 wherein said polymer is a copolymer consisting essentially of from about 1 and 99 weight percent of an N-vinyl oxazolidinone and from about 99 and 1 weight percent of an N-substituted ethylenically unsaturated lactam monomer represented by the structure:

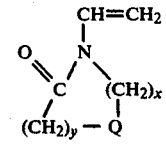

wherein Q represents C=O, O or CH₂; Y is 0, 1 or 2 and x is 0, 1, 2, 3 or 4.

14. The device of claim 13 wherein said N-vinyl oxazolidinone is N-vinyl-5-methyl-2-oxazolidinone or N-vinyl-5-ethyl-2-oxazolidinone and said N-substituted ethylenically unsaturated lactam is N-vinyl-2-pyrrolidinone, N-vinyl-2-piperidinone, N-vinyl-2-caprolactam, N-vinyl succinimide or N-vinyl-3-morpholinone.

15. The device of claim 1 wherein the enclosure member comprises at least two sides of light transmissive material which are affixed together to enclose a polymeric fluid which comprises water and a polymer having inverse solubility in water.

16. The device of claim 15 wherein said light transmissive material is plastic film.

17. The device of claim 15 wherein said light transmissive material is glass.

18. The device of claim 15 wherein the structure is contained with a frame.

* * * * *

UNITED STATES PATENT AND TRADEMARK OFFICE
CERTIFICATE OF CORRECTION

PATENT NO. : 4,260,225

DATED : April 7, 1981

INVENTOR(S) : Wilhelm E. Walles

It is certified that error appears in the above—identified patent and that said Letters Patent is hereby corrected as shown below:

Column 1, line 46, delete "pressure" and insert --presence--.

Column 6, line 40, delete "possibiliity" and insert --possibility--; line 44, delete "then" and insert --when--.

Column 12, line 14, delete "or" and insert --to--; line 16, delete "1" and insert --11--.

Signed and Sealed this

Fifteenth Day of September 1981

[SEAL]

Attest:

*Attesting Officer*

GERALD J. MOSSINGHOFF

*Commissioner of Patents and Trademarks*